(12) United States Patent
Bono (10) Patent No.: US 8,343,679 B2
(45) Date of Patent: Jan. 1, 2013

(54) FUEL CELL SYSTEM AND HYDROGEN LEAK JUDGMENT METHOD IN THE SYSTEM

(75) Inventor: Tetsuya Bono, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 379 days.

(21) Appl. No.: 12/741,958

(22) PCT Filed: Oct. 16, 2008

(86) PCT No.: PCT/JP2008/068768
§ 371 (c)(1),
(2), (4) Date: May 7, 2010

(87) PCT Pub. No.: WO2009/060702
PCT Pub. Date: May 14, 2009

(65) Prior Publication Data
US 2010/0248060 A1   Sep. 30, 2010

(30) Foreign Application Priority Data

Nov. 8, 2007 (JP) ................................. 2007-291160

(51) Int. Cl.
*H01M 8/04* (2006.01)
*H01M 8/22* (2006.01)

(52) U.S. Cl. .......................... 429/444; 429/431; 429/505

(58) Field of Classification Search .................. 429/429, 429/444, 513, 432, 428, 443, 505, 431; 70/40, 70/40.5 R
See application file for complete search history.

(56) References Cited

U.S. PATENT DOCUMENTS
2005/0238931 A1* 10/2005 Maier ............................ 429/13
(Continued)

FOREIGN PATENT DOCUMENTS
JP    2003-148252 A    5/2003
(Continued)

OTHER PUBLICATIONS

Machine Translation of: JP 2006/294304A, Goto et al., Oct. 26, 2006.*

(Continued)

*Primary Examiner* — Basia Ridley
*Assistant Examiner* — Kenneth Douyette
(74) *Attorney, Agent, or Firm* — Kenyon & Kenyon LLP (57) ABSTRACT

While the operation of a fuel cell is stopped, a pressure decrease caused by a current sweep is suppressed from being misjudged as being the occurrence of a hydrogen leak or a cross leak, and the judgment accuracy of the hydrogen leak, etc. is improved. In order to realize this feature, during an intermittent operation, in which, when a load on the fuel cell system is low, electrical power is supplied from a power storage unit in the fuel cell system to a power-consuming apparatus and power generation of a fuel cell is temporarily stopped, in the situation where a current sweep for suppressing a degradation of the fuel cell is performed, a hydrogen pressure in an anode of the fuel cell is corrected based on hydrogen consumed by the current sweep, and a hydrogen leak judgment based on a pressure decrease or a cross leak judgment based on a pressure decrease is performed on the basis of the corrected hydrogen pressure. For example, a pressure decrease speed of the hydrogen pressure in the anode which decreases due to power generation in the current sweep is integrated to obtain the amount of hydrogen pressure decrease caused by the power generation; and the amount of hydrogen pressure decrease can be reflected.

7 Claims, 7 Drawing Sheets

U.S. PATENT DOCUMENTS

| | | |
|---|---|---|
| 2007/0202367 A1 | 8/2007 | Yoshida |
| 2007/0224473 A1* | 9/2007 | Suematsu et al. ............... 429/25 |

FOREIGN PATENT DOCUMENTS

| | | | |
|---|---|---|---|
| JP | 2003-308866 A | | 10/2003 |
| JP | 2004-095425 A | | 3/2004 |
| JP | 2004/139842 A | * | 5/2004 |
| JP | 2004-192919 A | | 7/2004 |
| JP | 2006-294304 A | | 10/2006 |
| JP | 2006-294447 A | | 10/2006 |
| JP | 2006-302577 A | | 11/2006 |
| JP | 2007042566 A | * | 2/2007 |
| JP | 2007-134168 A | | 5/2007 |
| JP | 2007-165237 A | | 6/2007 |
| JP | 2007-280671 A | | 10/2007 |
| JP | 2008-147102 A | | 6/2008 |
| KR | 1020060072707 A | * | 6/2006 |
| WO | 2005/091397 A2 | | 9/2005 |
| WO | 2006/056878 A2 | | 6/2006 |

OTHER PUBLICATIONS

Machine Translation of: KR 1020060072707A, Jang, Jun. 28, 2006.*
Extended European Search Report mailed Jun. 22, 2012 in EP Application No. 08847783.1.

* cited by examiner

FUEL CELL SYSTEM AND HYDROGEN LEAK JUDGMENT METHOD IN THE SYSTEM

This is a 371 national phase application of PCT/JP2008/068768 filed 16 Oct. 2008, which claims priority to Japanese Patent Application No. 2007-291160 filed 8 Nov. 2007, the contents of which are incorporated herein by reference.

FIELD OF THE INVENTION

The present invention relates to a fuel cell system and a hydrogen leak judgment method in the system. More specifically, the present invention relates to an improvement in an operation control for a fuel cell system which is installed in, for example, a fuel cell vehicle.

BACKGROUND OF THE INVENTION

Among so-called fuel cell vehicles equipped with fuel cells (e.g., polymer electrolyte fuel cells) as power generation apparatuses, some fuel cell vehicles are configured to, during low load operations such as idling, traveling at a low speed and regenerative braking, temporarily stop power generation of a fuel cell and supply electrical power from power storage units such as batteries and capacitors to power-consuming apparatuses (e.g., vehicle motors), in order to increase fuel efficiency (in this specification, such an operation mode is referred to as an "intermittent operation").

During the intermittent operation, it is necessary to suppress an increase in an OCV (open circuit voltage) so that the fuel cell will not be degraded. In view of such circumstances, a technique has been known where a current sweep is performed to consume oxygen remaining in a cathode electrode, in order to maintain the electromotive force of the fuel cell so as to be equal to or lower than a degradation potential (for example, see patent document 1).

In addition, while the operation of the fuel cell is stopped, e.g., during the intermittent operation, whether or not a hydrogen leak or a cross leak occurs is judged based on a decrease in hydrogen pressure.

Patent document 1: JP2006-294304 A

DISCLOSURE OF THE INVENTION

Problem to be Solved by the Invention

However, when the occurrence of a hydrogen leak or a cross leak is judged based on a decrease in hydrogen pressure during an operation stop of the fuel cell, such as during the intermittent operation, as described above, a pressure decrease resulting from the current sweep might be misjudged as being the occurrence of the hydrogen leak or the cross leak.

An object of the present invention is to provide a fuel cell system and a hydrogen leak judgment method in the system which are capable of, in the situation where the occurrence of a hydrogen leak or a cross leak is judged based on a decrease in a hydrogen pressure during the operation stop of a fuel cell, such as during an intermittent operation, suppressing a pressure decrease caused by a current sweep from being misjudged as being the occurrence of a hydrogen leak or a cross leak, and thereby increasing the judgment accuracy of a hydrogen leak, etc.

Means for Solving the Problem

In order to achieve the object above, the inventors of the present invention have conducted various types of research.

In the related art, when whether or not a hydrogen leak or a cross leak occurs is judged, a gas pressure in an anode to which a hydrogen gas is supplied is detected, and it is determined that a hydrogen leak occurs if the gas pressure decreases. In such a configuration, if a pressure decrease (=the hydrogen leak) of a certain level or higher is found in the anode, 1) diagnosis is performed (the diagnosis having the functions of: prompting a driver to drive a vehicle to a safe place by lighting a lamp when a failure occurs in a sensor installed in the vehicle or when an abnormality occurs inside an ECU for a power train control; displaying the state of the vehicle on a predetermined tool in order to improve user friendliness; and stopping the system, the diagnosis also referred to as "Diag"), or 2) air blow is performed so that the concentration of exhaust hydrogen is maintained to be a certain level or lower.

Since a decrease in gas pressure in the anode and the amount of hydrogen permeation are substantially proportional to each other as long as a current sweep is not performed, the occurrence of a hydrogen leak or a cross leak can be determined only by monitoring the pressure of a hydrogen gas as in the related art. However, when the current sweep (or a high potential avoidance control, etc. by the current sweep) is performed during the intermittent operation, 1) a pressure decrease caused by the current sweep is misjudged as being a pressure decrease caused by a hydrogen leak and diagnosis is performed by mistake, or 2) the pressure decrease caused by the current sweep is misjudged as being a pressure decrease caused by a cross leak and air blow is performed more than necessary.

The inventors of the present invention, having conducted further research concerning the problem above, have come up with an idea which leads to a solution to the problem above. The present invention is based on such an idea and provides a fuel cell system capable of performing a current sweep for suppressing a degradation of a fuel cell during an operation stop of the fuel cell, in which a hydrogen pressure is corrected based on hydrogen consumed by the current sweep. As described above, when a current sweep is performed in a fuel cell system during the intermittent operation, a pressure decrease caused by the current sweep might be misjudged as being a pressure decrease caused by a hydrogen leak or a pressure decrease caused by a cross leak. In this regard, in the fuel cell system according to the present invention, the hydrogen consumed by the current sweep is taken into consideration and the amount of pressure decrease associating with the hydrogen consumption is corrected. With such a configuration, a hydrogen pressure can be obtained in consideration of the hydrogen decrease generated during the current sweep, and thus a misjudgment which might occur in various types of judgment can be suppressed. Here, the operation stop of the fuel cell in the fuel cell system occurs in an intermittent operation in which, when a load on the fuel cell system is low, electrical power is supplied from a power storage unit in the fuel cell system to a power-consuming apparatus and power generation of the fuel cell is temporarily stopped.

In the fuel cell system above, a hydrogen leak judgment based on a pressure decrease is performed on the basis of the corrected hydrogen pressure. With such a configuration, the accuracy of hydrogen leak judgment can be improved.

In the fuel cell system according to the present invention, when a current resulting from the current sweep is equal to or higher than a predetermined value, a hydrogen leak judgment is performed on the basis of the corrected hydrogen pressure. On the other hand, if the current as a result of the current sweep is below the predetermined value, it can be determined that the influence of the current sweep on a pressure decrease is relatively small. By omitting a correction of the hydrogen pressure when the current is small, a complicated control does not have to be always performed, which is a preferred feature.

In the fuel cell system according to the present invention, when a current resulting from the current sweep is equal to or higher than a predetermined value, a cross leak judgment is performed on the basis of the corrected hydrogen pressure. With such a configuration, the accuracy of cross leak judgment can be improved. When the amount of cross leak is equal to or higher than the predetermined value, an exhaust hydrogen concentration reduction control (e.g., air blow) is preferably performed so that the concentration of exhaust hydrogen on the cathode side after the intermittent operation is maintained to be a certain level or lower.

The fuel cell system includes a control unit which corrects the hydrogen pressure.

The fuel cell system according to the present invention corrects a hydrogen pressure in an anode of the fuel cell.

Furthermore, it is preferable that the fuel cell system includes a temperature sensor which measures a temperature of the fuel cell or a gas temperature in the anode, and that the measured temperature is also taken into consideration when the hydrogen pressure is corrected. The temperatures of the fuel cell and the hydrogen gas also affect the amount of hydrogen consumed by power generation. Accordingly, by obtaining a variation in the hydrogen pressure in consideration of such a temperature, the judgment accuracy can further be increased.

It is also preferable that the correction of the hydrogen pressure based on the hydrogen consumed by the current sweep is performed periodically. By performing the pressure detection and the reflection of a correction result several times, the influence of the current sweep can be detected earlier as compared to the configuration where such detection and reflection are performed at one time.

Provided according to the present invention is a hydrogen leak judgment method in a fuel cell system during an intermittent operation in which, when a load on the fuel cell system is low, electrical power is supplied from a power storage unit in the fuel cell system to a power-consuming apparatus and power generation of the fuel cell is temporarily stopped, the method comprising: correcting, when a current sweep for suppressing a degradation of the fuel cell is performed, a hydrogen pressure in an anode of the fuel cell based on hydrogen consumed by the current sweep; and performing, on the basis of the corrected hydrogen pressure, a hydrogen leak judgment based on a pressure decrease or a cross leak judgment based on a pressure decrease. Note that the "hydrogen leak judgment" in this specification is used in a broad sense, which encompasses not only the narrow sense of "hydrogen leak" but also the situation where hydrogen permeates as in a cross leak.

In the present invention, during the operation stop of the fuel cell, a pressure decrease caused by a current sweep can be suppressed from being misjudged as being the occurrence of a hydrogen leak or a cross leak, and the accuracy of judgment concerning the hydrogen leak, etc. can be improved.

DESCRIPTION OF REFERENCE NUMERALS

1: fuel cell, 100: fuel cell system, 130: temperature sensor, 162: battery (power storage unit), 700: control section (control unit)

BEST MODE FOR CARRYING OUT THE INVENTION

The configuration of the present invention will be described below based on exemplary embodiments shown in the drawings.

FIGS. 1 to 7 show embodiments of a fuel cell system according to the present invention. The fuel cell system 100 is configured as a system which includes: cells 2 that generate electrical power through an electrochemical reaction between a fuel gas and an oxidant gas; a cell stack 3 in which the cells 2 are stacked; and a control section 700 (control unit) that controls the supply flow rates of the fuel gas and the oxidant gas. First, the entire configuration of the fuel cell system 100 as well as the configuration of the cells 2 which constitute a fuel cell 1 will be described, and then configurations and processing for improving the judgment accuracy by suppressing misjudgment concerning the occurrence of a hydrogen leak or a cross leak during the operation stop of the fuel cell, such as during the intermittent operation will be described.

Figure 1:
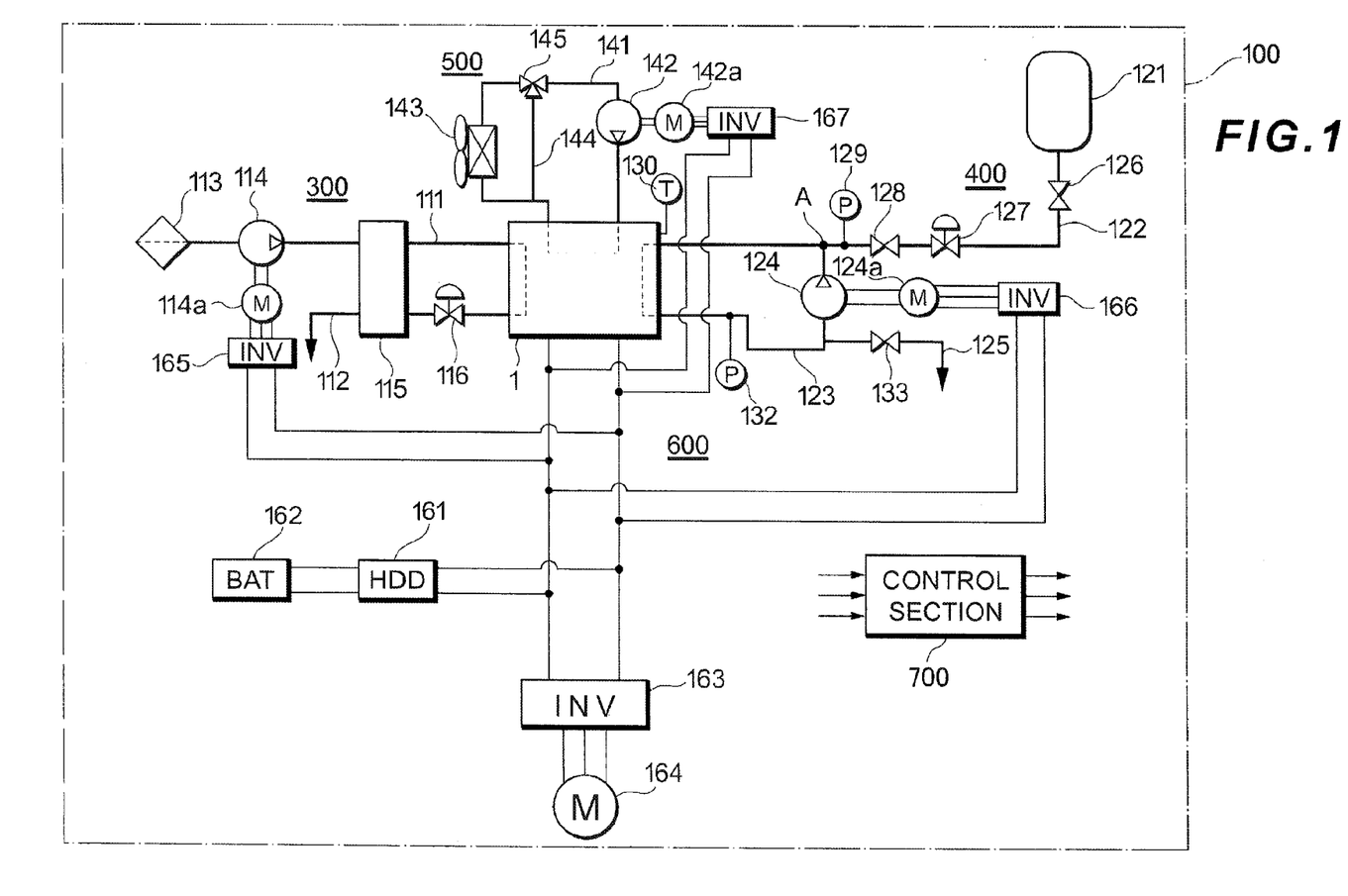
FIG. 1 is a diagram showing a configuration example of a fuel cell system.

FIG. 1 schematically shows the configuration of the fuel cell system 100 in the present embodiment. As shown in FIG. 1, the fuel cell system 100 includes: the fuel cell 1; an oxidant gas supply-and-discharge system (hereinafter also referred to as an "oxidant gas pipe system") 300 which supplies the air (oxygen) as an oxidant gas to the fuel cell 1; a fuel gas supply-and-discharge system (hereinafter also referred to as the "fuel gas pipe system") 400 which supplies hydrogen as a fuel gas to the fuel cell 1; a coolant pipe system 500 which supplies a coolant to the fuel cell 1 to cool the fuel cell 1; a power system 600 which charges and discharges an electrical power of the system; and a control section 700 which centrally controls the entire system.

The fuel cell 1 is, for example, a solid polymer electrolyte type which has a stack structure with a lot of cells (unit cells) 2 stacked therein. Each cell 2 has an air electrode on one surface of an electrolyte constituted from an ion-exchange membrane and a fuel electrode on the other surface of the electrolyte, and the cell 2 further has a pair of separators 20 which sandwich the air electrode and the fuel electrode therebetween. The fuel gas is supplied to a fuel gas flow path of one separator 20 while the oxidant gas is supplied to an oxidant gas flow path of the other separator 20, and the fuel cell 1 generates electrical power by such supply of gasses.

The oxidant gas pipe system 300 includes: a supply path 111 in which the oxidant gas to be supplied to the fuel cell 1 flows; and a discharge path 112 in which an oxidant-off gas discharged from the fuel cell 1 flows. The supply path 111 is provided with: a compressor 114 which introduces the oxidant gas via a filter 113; and a humidifier 115 which humidifies the oxidant gas compressed by and sent from the compressor 114. After passing through a backpressure regulating valve 116 and being subjected to moisture exchange in the humidifier 115, the oxidant-off gas flowing in the discharge path 112 is finally exhausted as an exhaust gas to the atmosphere outside the system. The compressor 114 introduces the oxidant gas from the atmosphere by driving a motor 114a.

The fuel gas pipe system 400 includes: a hydrogen supply source 121; a supply path 122 in which a hydrogen gas supplied from the hydrogen supply source 121 to the fuel cell 1 flows; a circulation path 123 which returns a hydrogen-off gas (fuel-off gas) discharged from the fuel cell 1 to a point of merge A on the supply path 122; a pump 124 which pumps the hydrogen-off gas in the circulation path 123 into the supply path 122; and a discharge path 125 which is connected to the circulation path 123 in such a manner branching from the circulation path 123.

The hydrogen supply source 121 is constituted from, for example, a high-pressure tank and a hydrogen-absorbing alloy, the hydrogen supply source 121 being configured so that a hydrogen gas of, for example, 35 MPa or 70 MPa can be stored therein. When opening a main valve 126 in the hydrogen supply source 121, the hydrogen gas flows into the supply flow path 122. The hydrogen gas is finally decompressed to, for example, 200 kPa by a pressure regulating valve 127 and other pressure-reducing valves, and supplied to the fuel cell 1.

The upstream of the point of merge A on the supply path 122 is provided with a cutoff valve 128 and a pressure sensor 129 which detects the pressure of the hydrogen gas in the supply path 122. A hydrogen gas circulation system is constituted by a flow path on the downstream of the point of merge A in the supply path 122, a fuel gas flow path formed in the separator in the fuel cell 1, and the circulation path 123, which are sequentially communicate with each other. The hydrogen pump 124 circulates and supplies the hydrogen gas in the circulation system to the fuel cell 1 by driving a motor 124a. The reference numeral 130 denotes a temperature sensor which detects the temperature of the fuel cell 1 or the hydrogen gas.

The circulation path 123 is provided with a pressure sensor 132 which detects the pressure of the hydrogen-off gas (fuel-off gas). The discharge path 125 is provided with a purge valve 133 being a cutoff valve. By suitably opening the purge valve 133 during the operation of the fuel cell system 100, impurities in the hydrogen-off gas are discharged together with the hydrogen-off gas to a hydrogen diluter (not shown). As a result of the opening of the purge valve 133, the impurity concentration of the hydrogen-off gas in the circulation path 123 decreases, and the hydrogen concentration of the hydrogen-off gas to be circulated and supplied increases.

The coolant pipe system 500 includes: a coolant circulation flow path 141 which communicates with a coolant flow path in the fuel cell 1; a cooling pump 142 provided in the coolant circulation flow path 141; a radiator 143 which cools a coolant discharged from the fuel cell 1; a bypass flow path 144 which bypasses the radiator 143; and a three-way valve (switching valve) 145 which sets the distribution of the coolant to the radiator 143 and the bypass flow path 144. The cooling pump 142 circulates and supplies the coolant in the coolant circulation flow path 141 to the fuel cell 1 by driving a motor 142a.

The power system 600 includes a high-voltage DC/DC converter 161, a battery (power storage unit) 162, a traction inverter 163, a traction motor 164, and various auxiliary inverters 165, 166 and 167. The high-voltage DC/DC converter 161 is a direct-current voltage converter, which has: a function of regulating a direct-current voltage input from the battery 162 and outputting the regulated voltage to the traction inverter 163; and a function of regulating a direct-current voltage input from the fuel cell 1 or the traction motor 164 and outputting the regulated voltage to the battery 162. Due to these functions of the high-voltage DC/DC converter 161, the battery 162 can be charged and discharged. The high-voltage DC/DC converter 161 controls an output voltage of the fuel cell 1.

The battery 162 includes stacked battery cells and provides a certain high voltage as a terminal voltage, the battery 162 being capable of being charged with surplus power and supplying electrical power in an auxiliary manner under the control of a battery computer (not shown). The traction inverter 163 converts a direct current to a three-phase alternating current, and supplies the three-phase alternating current to the traction motor 164. The traction motor 164 is, for example, a three-phase alternating current motor, which serves as a main power source for, for example, a vehicle equipped with the fuel cell system 100.

The auxiliary inverters 165, 166 and 167 are electric motor control apparatuses which control the drive of corresponding motors 114a, 124a and 142a, respectively. The auxiliary inverters 165, 166 and 167 convert a direct current to a three-phase alternating current, and supply the three-phase alternating current to the motors 114a, 124a and 142a, respectively. The auxiliary inverters 165, 166 and 167 are, for example, pulse width modulation-type (PWM) inverters, which convert a direct-current voltage output from the fuel cell 1 or the battery 162 to a three-phase alternating current voltage in accordance with a control command from the control section 700 and control rotary torques generated in the respective motor 114a, 124a and 142a.

The control section 700 is configured as a microcomputer provided with a CPU, ROM and RAM inside. The CPU performs a desired computation in accordance with a control program to perform various types of processing and control such as a defrosting control for the pump 124 (described later). The ROM stores a control program and control data that are processed by the CPU. The RAM is mainly used as various work areas for control processing. Detected signals from various types of pressure sensors, temperature sensors, outside air temperature sensors, etc., used in the gas systems (300 and 400) and the coolant pipe system 500 are input to the control section 700, and the control section 700 outputs control signals to respective components.

Figure 2:
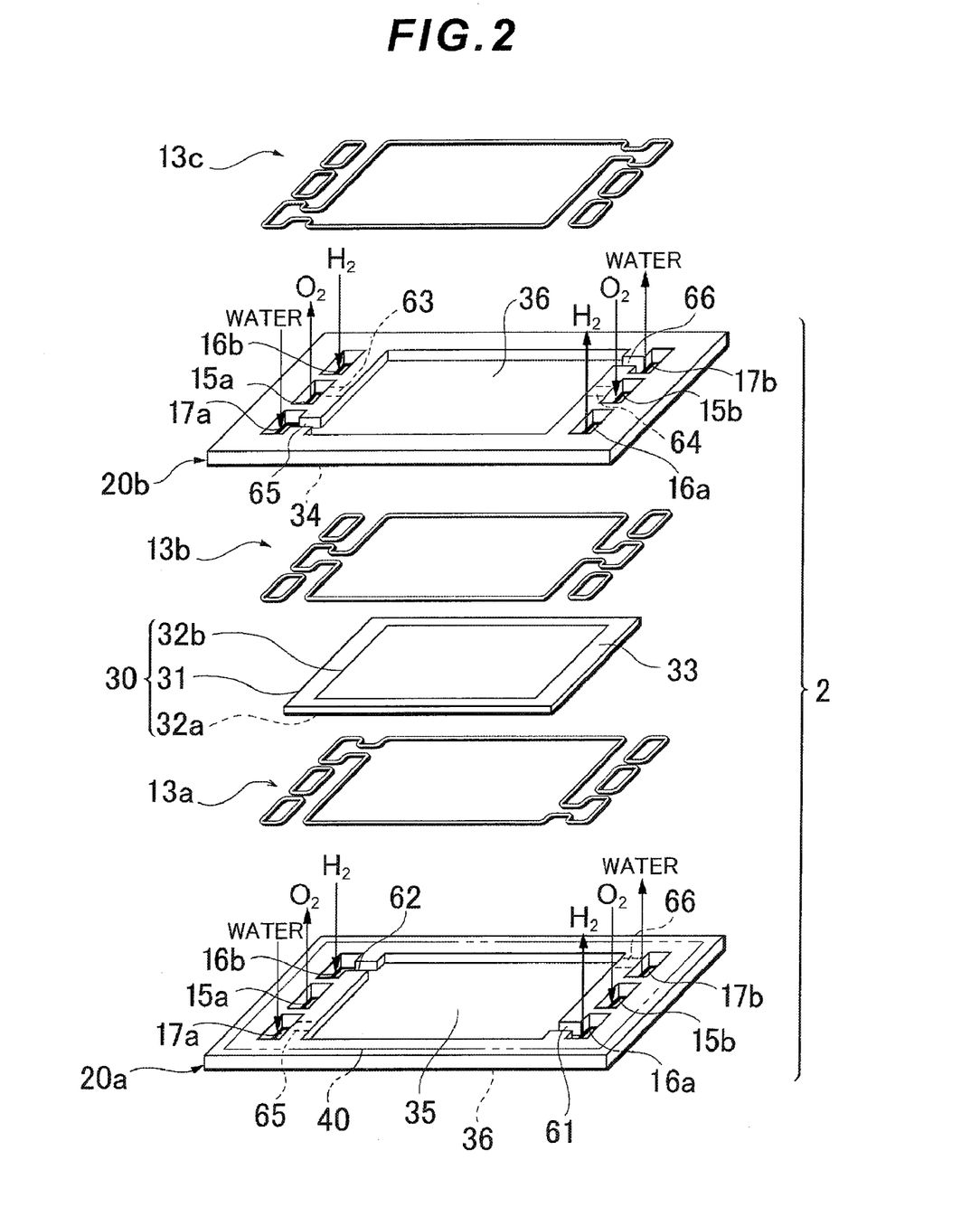
FIG. 2 is an exploded perspective view showing a cell in a cell stack body in an exploded manner.
Figure 3:
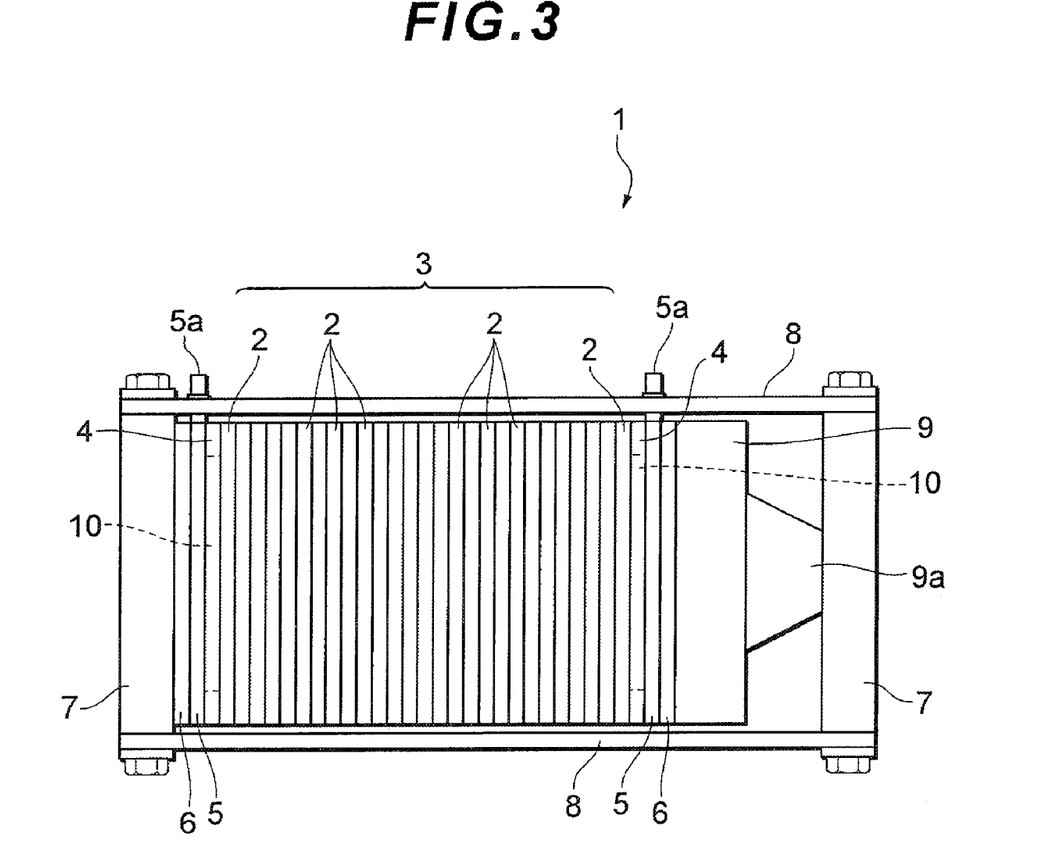
FIG. 3 is a perspective view showing the configuration of a cell stack in a fuel cell.
Figure 4:
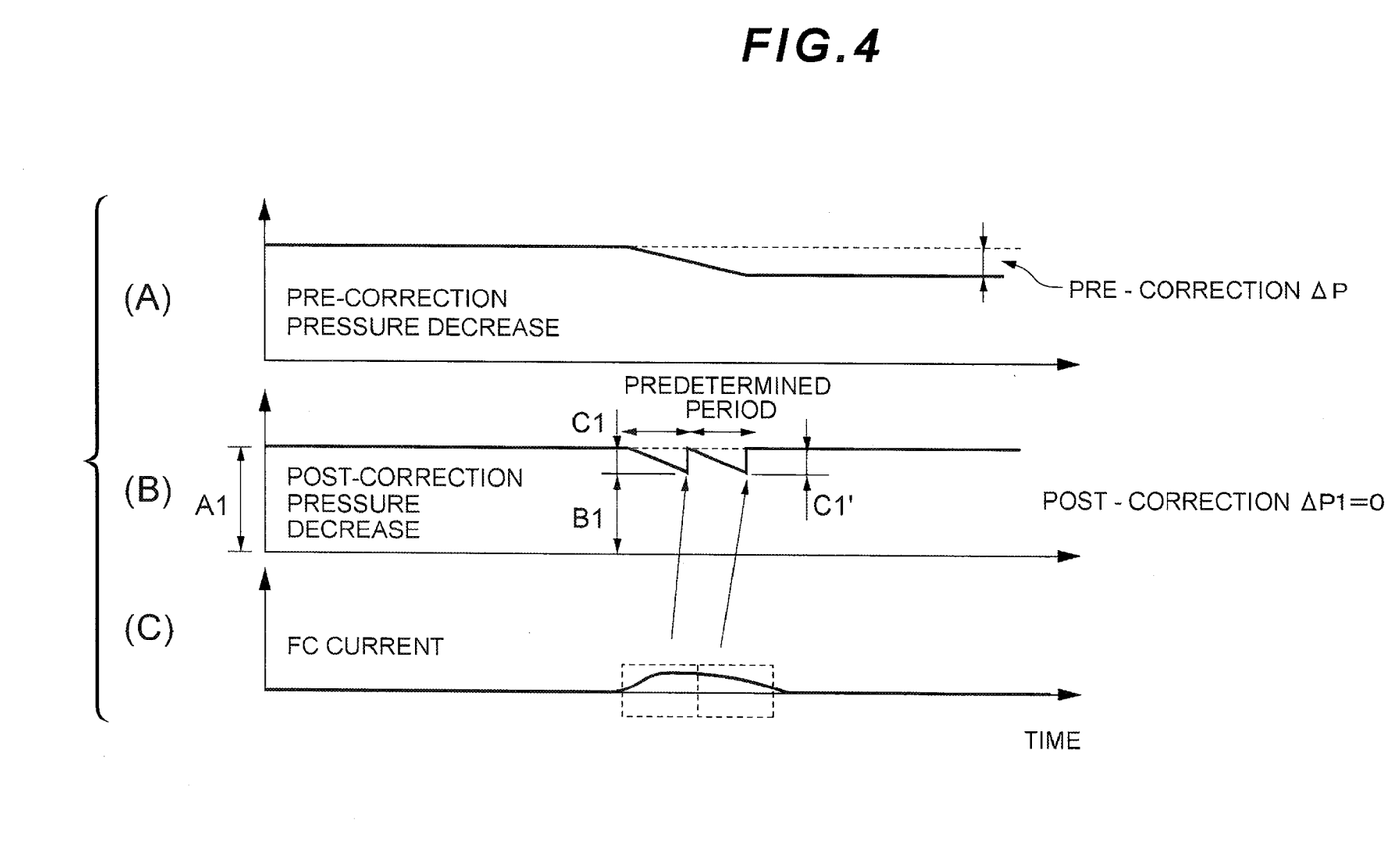
FIG. 4(A) is a reference diagram showing a variation in an anode pressure (a "pre-correction pressure decrease") when hydrogen consumed by a current sweep is not taken into consideration in a hydrogen leak judgment according to the present invention.
FIG. 4(B) is a diagram showing a variation in an anode pressure (a "post-correction pressure decrease") when hydrogen consumed by a current sweep is taken into consideration in the hydrogen leak judgment according to the present invention.
FIG. 4(C) is a diagram showing the value of power generation current in the fuel cell (an "FC current") in the hydrogen leak judgment according to the present invention.

Next, the configurations of the fuel cell 1 and the cells 2 in the present embodiment will be schematically shown in FIGS. 2 and 3. The cells 2, which are configured as shown, are stacked one after another and constitute a cell stack body 3 (see FIG. 3). In a fuel cell stack which includes the cell stack body 3, etc., both ends of the stack are sandwiched by a pair of end plates 7 and restraining members, which are constituted from tension plates 8, are arranged so as to connect the end plates 7 to each other, and in such a state, a load is applied on the fuel cell stack in a stacking direction and the fuel cell stack is thereby fastened (see FIG. 3).

Although the fuel cell 1 which includes the above-described fuel cell stack, etc. can be applied to an in-vehicle power generation system for, for example, FCHVs (Fuel Cell Hybrid Vehicles), the fuel cell 1 is not limited thereto and may also be applied to power generation systems provided in various mobile objects (e.g., ships and airplanes) and self propelled objects such as robots, as well as to stationary power generation systems.

The cells 2 each include: an electrolyte, a specific example of which is a membrane-electrode assembly (hereinafter referred to as an "MEA") 30; a pair of separators 20 (which are denoted respectively as 20a and 20b in FIG. 2) which hold the MEA 30 therebetween, etc. (see FIG. 2). The MEA 30 and the separators 20a and 20b are formed into rectangular plates. The MEA 30 is formed so that its contour is smaller than the contours of the separators 20a and 20b.

The MEA 30 includes: a polymer electrolyte membrane which is constituted from an ion-exchange membrane made of a polymer material (hereinafter also simply referred to as an "electrolyte membrane") 31; and a pair of electrodes (an anode side diffusion electrode and a cathode side diffusion electrode) 32a and 32b which sandwich both surfaces of the electrolyte membrane 31 (see FIG. 2). The electrolyte membrane 31 is formed to be larger than each electrode 32a and 32b. The electrodes 32a and 32b are joined with the electrolyte membrane 31 by, for example, hot pressing with a margin 33 of the electrolyte membrane 31 being left out.

The electrodes 32a and 32b of the MEA 30 are each made of a porous carbon material (diffusion layer) which supports a catalyst, such as platinum, deposited on the surface thereof. A hydrogen gas as a fuel gas (reaction gas) is supplied to one electrode (anode) 32a, while an oxidant gas such as the air and an oxidizing agent (reaction gas) is supplied to the other electrode (cathode) 32b, and these two types of reaction gasses cause an electrochemical reaction in the MEA 30 and an electromotive force of the cells 2 is thus produced.

The separators 20 (20a and 20b) are each made of a gas impermeable and electrically conductive material. Examples of the electrically conductive material may include a carbon, a hard resin having electrical conductivity, and metal such as aluminum and stainless steel. Base materials of the separators 20 (20a and 20b) in the present embodiment are formed of plate-shaped metal (metal separators), and films having an excellent corrosion resistance (e.g., films formed by gold plating) are formed on the electrode 32a side surface and the electrode 32b side surface of the base materials.

Both surfaces of each separator 20a and 20b are provided with grooved flow paths which are constituted from a plurality of recesses. These flow paths can be formed by, for example, press molding in the present embodiment where the base materials of the separators 20a and 20b are formed of, for example, plate-shaped metals. The grooved flow paths formed as described above serve as a gas flow path 34 for the oxidant gas, a gas flow path 35 for the hydrogen gas and a coolant flow path 36. Specifically, the inner surface, which is the electrode 32a side surface, of the separator 20a is provided with the gas flow path 35 for the hydrogen gas, and on the back surface thereof (the outer surface) is provided with the coolant flow path 36 (see FIG. 2). In the same way, the inner surface, being the electrode 32b side surface, of the separator 20b is provided with the gas flow path 34 for the oxidant gas, and the back surface thereof (the outer surface) is provided with the coolant flow path 36 (see FIG. 2). In the present embodiment, for example, assuming, that the outer surface of the separator 20a of one cell 2 in two adjacent cells 2 and 2 and the outer surface of the separator 20b of the other cell 2 are brought into contact with each other, the coolant flow paths 36 in both the separators are integrated and define a flow path having, for example, a rectangular or honeycomb cross section.

As described above, in each separator 20a, 20b, at least, protrusions and recesses, which define the flow paths for fluids, are inverted on the front surface and the back surface. More specifically, in the separator 20a, the back surface of a protrusion (protruded rib) defining the gas flow path 35 for the hydrogen gas constitutes a recess (recessed groove) defining the coolant flow path 36, while the back surface of a recess (recessed groove) defining the gas flow path 35 constitutes a protrusion (protruded rib) defining the coolant flow path 36. In the separator 20b, the back surface of a protrusion (protruded rib) defining the gas flow path 34 for the oxidant gas constitutes a recess (recessed groove) defining the coolant flow path 36, while the back surface of a recess (recessed groove) defining the gas flow path 34 constitutes a protrusion (protruded rib) defining the coolant flow path 36.

In each separator 20a and 20b, an oxidant gas-inlet side manifold 15a, a hydrogen gas-outlet side manifold 16b and a coolant-inlet side manifold 17a are formed in the vicinity of an end in the longitudinal direction (in the present embodiment, in the vicinity of an end shown on the left in FIG. 2). In the present embodiment, for example, these manifolds 15a, 16b and 17a are formed as through holes, having a substantially rectangular, trapezoidal or oblong (having semicircular ends) shape, which are provided in each separator 20a and 20b (see FIG. 2). On the opposite end of each separator 20a and 20b, an oxidant gas-outlet side manifold 15b, a hydrogen gas-inlet side manifold 16a and a coolant-outlet side manifold 17b are formed. In the present embodiment, these manifolds 15b, 16a and 17b are also formed as through holes having a substantially rectangular, trapezoidal or oblong (having semicircular ends) shape (see FIG. 1). Note that, in FIG. 2, the reference numerals of the respective manifolds are shown with the alphabetical characters "a" and "b" omitted.

Of the manifolds described above, the hydrogen gas-inlet side manifold 16a and the hydrogen gas-outlet side manifold 16b in the separator 20a each communicate with the gas flow paths 35 for the hydrogen gas via an inlet side communication path 61 and an outlet side communication path 62 formed in the separator 20a. In the same way, the oxidant gas-inlet side manifold 15a and the oxidant gas-outlet side manifold 15b in the separator 20b each communicate with the gas flow path 34 for the oxidant gas via an inlet side communication path 63 and an outlet side communication path 64 formed in the separator 20b (see FIG. 2). In addition, the coolant-inlet side manifold 17a and the coolant-outlet side manifold 17b in each separator 20a and 20b each communicate with the coolant flow path 36 via an inlet side communication path 65 and an outlet side communication path 66 formed in each separator 20a and 20b. With the above-described configurations of the separators 20a and 20b, the oxidant gas, hydrogen gas and coolant are supplied to the cells 2. Specifically, for example, when the cells 2 are stacked, the hydrogen gas entering from the inlet side manifold 16a in the separator 20a passes through the communication path 61 and flows into the gas flow path 35, and then after being used for power generation in the MEA 30, passes through the communication path 62 and flows out from the outlet side manifold 16b.

Note that in the present embodiment, the coolant-inlet side manifold 17a and the coolant-outlet side manifold 17b are respectively arranged on one end and on the other end of opposite sides with respect to a coolant flowing direction in the separator 20 (see FIG. 2). In other words, in the present embodiment, the coolant-inlet side manifold 17a and the coolant-outlet side manifold 17b are arranged on a diagonal line of the separator 20, and such a configuration helps the coolant to be distributed to the entire separator 20.

A first seal member 13a and a second seal member 13b each include a plurality of members (e.g., four small independent rectangular frames and a large frame which defines a fluid flow path) (see FIG. 2). Of these seal members, the first seal member 13a is provided between the MEA 30 and the separator 20a, and more specifically, the first seal member 13a is provided so that a portion thereof is interposed between the margin 33 of the electrolyte membrane 31 and a circumferential portion of the gas flow path 35 in the separator 20a. The second seal member 13b is provided between the MEA 30 and the separator 20b, and more specifically, the second seal member 13b is provided so that a portion thereof is interposed between the margin 33 of the electrolyte membrane 31 and a circumferential portion of the gas flow path 34 in the separator 20b.

A third seal member 13c which includes a plurality of members (e.g., four small independent rectangular frames and a large frame which defines a fluid flow path) is provided between the separator 20b and the separator 20a of adjacent cells 2 and 2 (see FIG. 2). The third seal member 13c is provided so as to be interposed between a circumferential portion of the coolant flow path 36 in the separator 20b and a circumferential portion of the coolant flow path 36 in the separator 20a, thereby providing a seal therebetween.

Examples of the first to third seal members 13a to 13c may include: an elastic body (gasket) which provides a physical close contact with an adjacent member to seal a fluid therein; and an adhesive which adheres to an adjacent member through chemical bonding with the adjacent member. Although, as an example, the present embodiment employs a member which provides physical sealing with its elasticity as the seal members 13a to 13c, a member which provides sealing through chemical bonding in a similar way to the adhesive described above may alternatively be employed.

Frame members 40 are members which are made of, for example, a resin and sandwiched together with the MEA 30 between the separator 20a and the separator 20b (hereinafter referred to as a "resin frame"). In the present embodiment, for example, the resin frames 40, which are formed into thin frames, are interposed between the separator 20a and the separator 20b, so that at least a portion of the MEA 30, e.g., a portion along the margin 33, is sandwiched, from the front surface side and the back surface side, by these resin frames 40. The resin frames 40 function as: spacers provided between the separators 20 (20a and 20b) for supporting a fastening force; insulating members; and reinforcing members for reinforcing the rigidity of the separators 20 (20a and 20b).

Next, the configuration of the fuel cell 1 will be briefly described (see FIG. 3). The fuel cell 1 in the present embodiment includes the cell stack body 3 in which a plurality of cells 2 is stacked, and the fuel cell 1 further includes heat insulation cells 4, terminal plates 5 provided with output terminals 5a, insulators (insulating plates) 6 and end plates 7, which are provided in series on the outside of cells 2 and 2 positioned at both ends of the cell stack body 3 (end cells).

The tension plates 8 which span so as to connect the end plates 7 apply a predetermined compression force to the cell stack body 3 in a stacking direction. A pressure plate 9 and a spring mechanism 9a are provided between the end plate 7 on an end of the cell stack body 3 and the insulator 6, so that a variation in the load applied to the cell 2 is absorbed.

The heat insulation cells 4 each form a heat insulation layer with, for example, two separators and a seal member, the heat insulation cells 4 functioning to suppress heat, which is generated due to power generation, to be released to the atmosphere. In other words, in general, the temperature of ends of the cell stack body 3 tend to be lowered due to heat exchange with the atmosphere, and thus heat insulation layers are formed on the ends of the cell stack body 3 in order to suppress the heat exchange (heat release). Examples of such heat insulation layers include a configuration in which a pair of separators, which are similar to those used in the cells 2, sandwich a heat insulation member 10, such as an electrically conductive plate, instead of the membrane-electrode assembly. The heat insulation member 10 used in this configuration preferably have higher heat insulating properties, and specifically, an electrically conductive porous sheet may be used. By sealing the periphery of the heat insulating member 10 with a seal member, an air layer is formed.

The terminal plates 5 are members which function as current collectors, the terminal plates 5 being made of metal such as iron, stainless steel, copper and aluminum and formed into a plate. In each terminal plate 5, surface treatment such as plating is provided to a surface closer to the heat insulation cell 4, and such surface treatment ensures a contact resistance with the heat insulation cell 4. Examples of the plating may include gold, silver, aluminum, nickel, zinc and tin. In the present embodiment, tin plating is provided in consideration of its electrical conductivity, workability and low cost.

The insulators 6 function to electrically insulate the terminal plates 5, the end plates 7, etc. In order to realize such a function, the insulators 6 are made of a resin material such as polycarbonate and formed into plates.

The end plates 7 are made of various kinds of metal (e.g., iron, stainless steel, copper and aluminum) and formed into plates, in the same way as the terminal plates 5. In the present embodiment, for example, the end plates 7 are formed using copper, but this is merely an example and the end plates 7 may be formed using other kinds of metal.

The tension plates 8 are provided so as to span between the end plates 7 and 7, and, for example, a pair of tension plates is arranged on both ends of the cell stack body 3 so as to face each other (see FIG. 3). The tension plates 8 are fixed to the end plates 7 and 7 using a bolt or the like, and maintain a state where a predetermined fastening force (compression force) acts in the stacking direction of the unit cells 2. An inner surface of each tension plate 8 (the surface facing the cell stack body 3) is provided with an insulating film in order to prevent the occurrence of electrical leakage and the generation of sparks. The insulating film is formed by an insulating tape which is attached to the inner surface of the tension plate 8 or resin coating which is applied so as to cover the inner surface of the tension plate 8.

Next, a configuration and processing for suppressing, during the operation stop of the fuel cell, such as during the intermittent operation, misjudgment concerning the occurrence of a hydrogen leak or a cross leak in order to improve the judgment accuracy (see FIGS. 4(A) to 7).

In the fuel cell system 100 of the present embodiment, in the situation where a current sweep for suppressing degradation of the fuel cell 1 is performed during the operation stop of the fuel cell 1, a hydrogen pressure (hereinafter also referred to as the "anode pressure") is corrected based on hydrogen consumed by the current sweep. When a current sweep is performed during the intermittent operation in the fuel cell system 100, a decrease in pressure caused by the current sweep is often misjudged as being a decrease in pressure caused by a hydrogen leak or a cross leak. However, in the present embodiment, hydrogen consumption caused by such a current sweep is taken into account, and a decrease in pressure associated with the hydrogen consumption is corrected. In such a configuration, an anode pressure can be obtained by taking into account a pressure decrease generated during the current sweep, thereby suppressing misjudgment which might occur when various types of judgments are made.

First Embodiment

Figure 5:
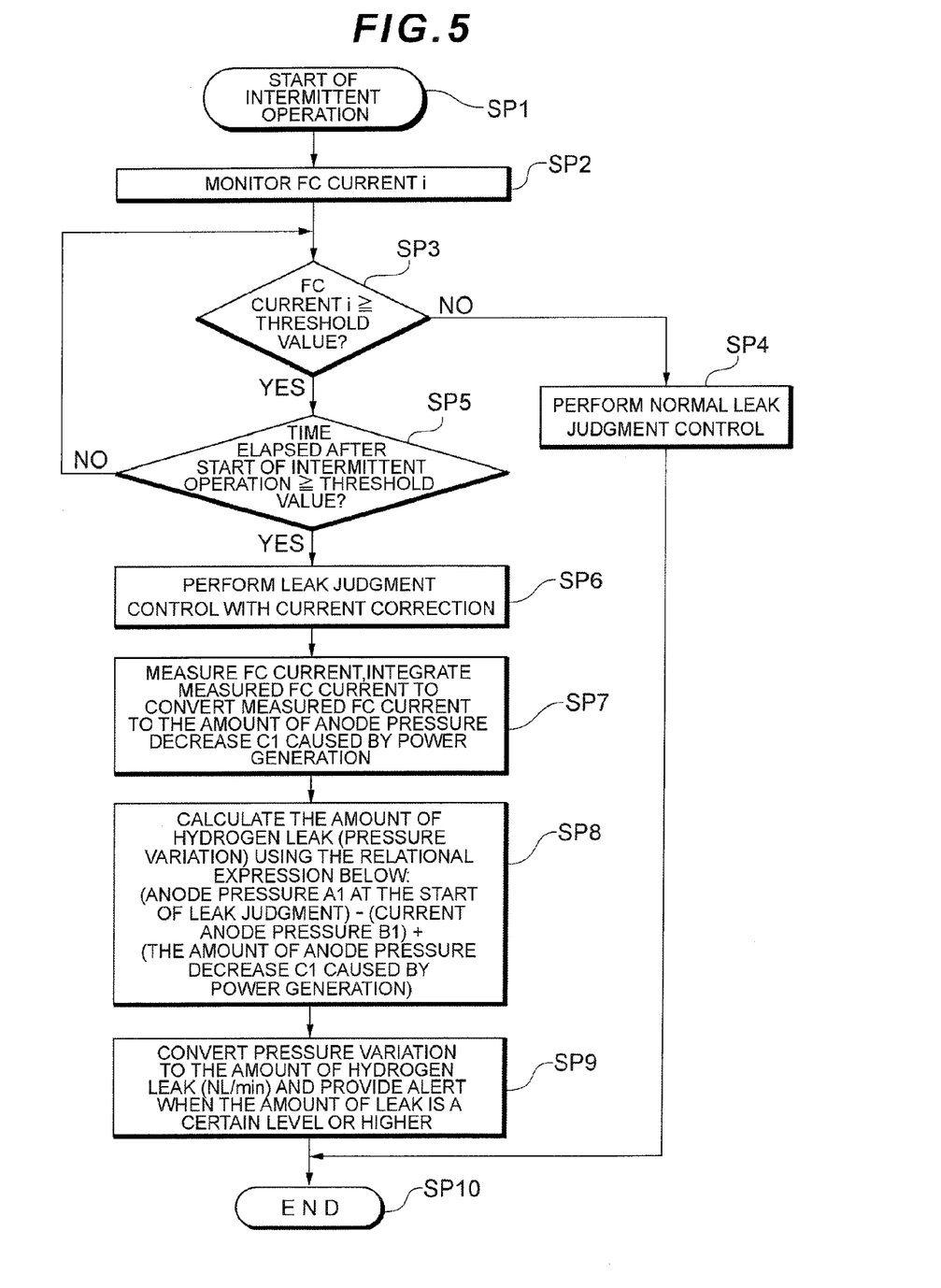
FIG. 5 is a flow chart showing an example of processing in the hydrogen leak judgment.
Figure 6:
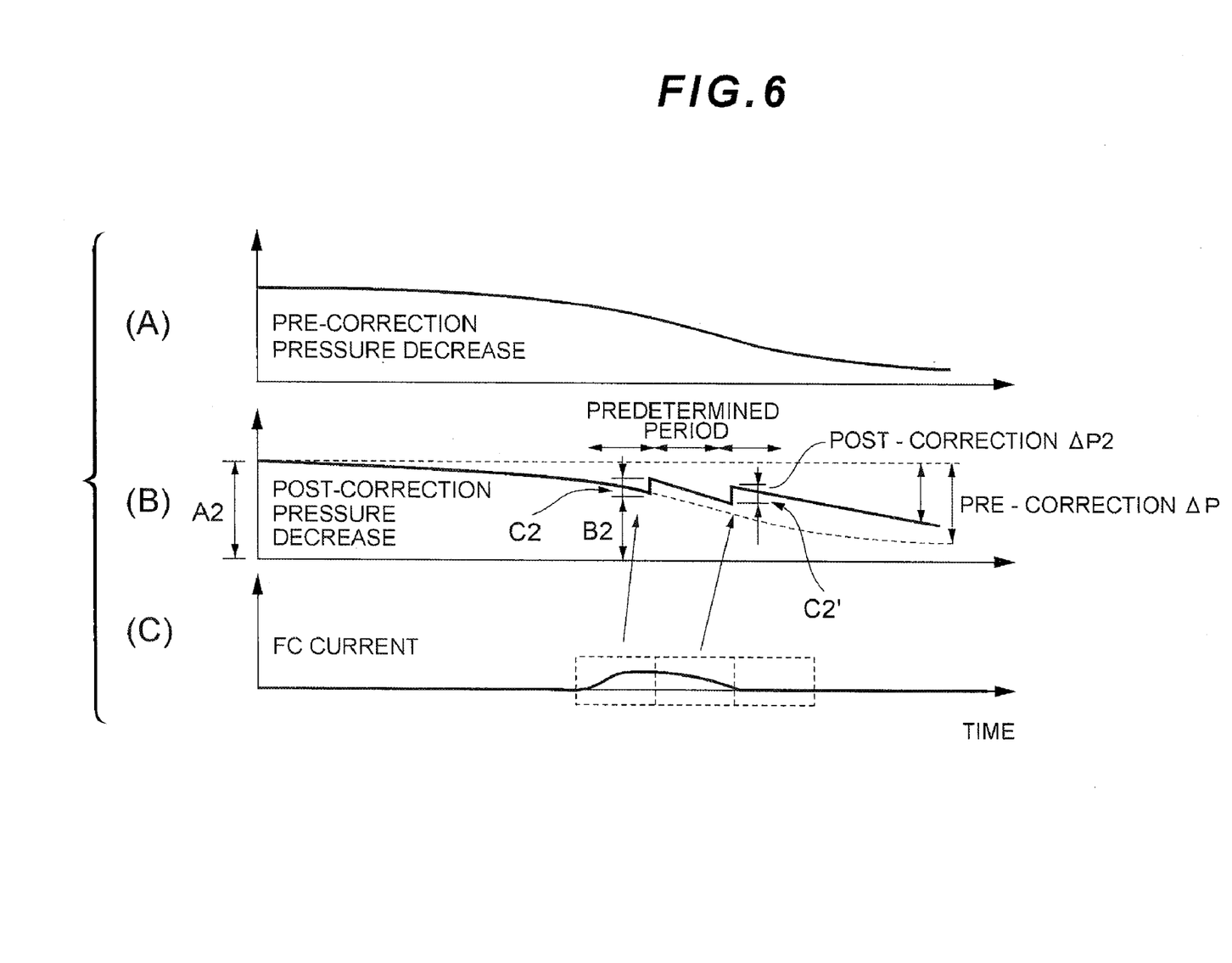
FIG. 6(A) is a reference diagram showing a variation in an anode pressure (a "pre-correction pressure decrease") when hydrogen consumed by a current sweep is not taken into consideration in a cross leak judgment according to the present invention.
FIG. 6(B) is a diagram showing a variation in an anode pressure (a "post-correction pressure decrease") when hydrogen consumed by a current sweep is taken into consideration in the cross leak judgment according to the present invention.
FIG. 6(C) is a diagram showing the value of power generation current in the fuel cell (an "FC current") in the cross leak judgment according to the present invention.

The following description describes a specific example of a hydrogen leak judgment which is made in the state where the fuel cell 1 is stopped, using: a graph of "pre-correction pressure decrease" indicating an anode pressure (the pressure of hydrogen gas) for which a hydrogen consumption caused by the current sweep is not taken into account (FIG. 4(A)); a graph of "post-correction pressure decrease" indicating the anode pressure for which the hydrogen consumption caused by the current sweep is taken into account (FIG. 4(B)); a graph of an "FC current" indicating a power generation current value of the fuel cell 1 (FIG. 4(C)); and a flowchart showing an example of hydrogen leak judgment processing (FIG. 5). The vertical axes in FIGS. 4(A) and 4(B) each indicate a pressure value, the vertical axis in FIG. 4(C) indicates a current value, and the horizontal axes in these figures each indicate time. The anode pressures in FIG. 4(A) and FIG. 4(B) each indicate a pressure in a so-called hydrogen low-pressure system in the anode or in the vicinity of the anode in the fuel cell 1, and detection results of the pressure sensor 132, etc. may be utilized. Note that a power generation current of the fuel cell 1 will be hereinafter referred to also as an "FC current," and the value of the FC current will be indicated as an "FC current i."

First, when an intermittent operation is started in the fuel cell system 100 (step SP1), an FC current i is measured, and monitored using the control section 700 (step SP2). During the monitoring, it is judged whether or not the FC current i is equal to or higher than a threshold value (step SP3). If the FC current i is below the threshold value (step SP3: NO), it is determined that a pressure decrease caused by a current sweep is also small accordingly, and thus an influence of the current sweep is relatively small, i.e., a disturbance which may affect the hydrogen leak judgment is sufficiently small, and then a normal hydrogen leak judgment control is performed (step SP4). In such a case, an anode pressure may not be corrected, which means steps SP5 onward can be omitted, and thus the processing can be simplified.

On the other hand, if the FC current i is equal to or higher than the threshold value (step SP3: YES), it is judged whether or not the time which is equal to or longer than a predetermined time period (threshold value) has elapsed from the start of the intermittent operation (step SP5). If the predetermined time period has not elapsed (step SP5: NO), the processing returns to step SP3 and the judgment concerning the magnitude of the FC current i is performed again (step SP3). On the other hand, if the predetermined time period has elapsed (step SP5: YES), the processing proceeds to step SP6. In the present embodiment, if the FC current i does not fall below the threshold value during the predetermined time period after the intermittent operation is started, the processing of step SP6 onward is performed to make a correction.

In step SP6, the current is corrected, and the hydrogen leak judgment control is performed (step SP6). Specifically, this control is performed as follows. First, an FC current i is measured, and the measured current is integrated by the control section 700 and converted to the amount of an anode pressure decrease C1 caused by power generation (step SP7). Then a variation ΔP1 in the anode pressure is obtained based on the following relational expression:

Variation ΔP1 in anode pressure=anode pressure A1 at the start of leakage judgment−the current anode pressure B1+the amount of anode pressure decrease C1 caused by power generation [Relational Expression 1]

The variation ΔP1 in the anode pressure obtained as described above is a variation after a correction which has been made by taking the influence of the current sweep into account. In other words, assuming that the anode pressure at the start of the leakage judgment is A1 and the current anode pressure is B1 (see FIG. 4(B)), the difference between A1 and B1 (the value of A1−B1) corresponds to a pre-correction anode pressure variation ΔP. In the related art, the value ΔP has been handled as a pressure variation resulting from a hydrogen leak (or a cross leak), and thus a misjudgment has often been made where it is determined that a hydrogen leak occurs even when any hydrogen leak does not actually occur. In this regard, in the present embodiment, the "amount of anode pressure decrease C1 caused by power generation" is determined, and the influence of the current sweep on the pressure is reflected, as described above. Specifically, for example, if any hydrogen leak does not occur during the intermittent operation, the pressure decrease resulting from a hydrogen leak is 0 (zero), and, in the present embodiment, it is determined, by taking a pressure variation caused by the current sweep (the amount of anode pressure decrease C1) into account, that the anode pressure variation ΔP1 is 0, and thus the judgment result that no hydrogen leak occurs can be obtained (see FIG. 4(B)). On the other hand, in the related art, the result that the anode pressure variation ΔP is 0 cannot be obtained in the same situation, which might raise the possibility of misjudgment (see FIG. 4(A)).

After step SP8 above, in the present embodiment, the anode pressure variation ΔP1 is converted to the amount of hydrogen leak (NL/min), and an alert is provided when the amount of hydrogen leak is equal to or higher than a certain level (step SP9). In such a case, an embodiment of the alert may be similar to those in the related art. After performing the sequence of operations above, the hydrogen leak judgment during the operation stop of the fuel cell system 100 is ended (step SP10).

Note that the relational expressions relating to the conversion from the anode pressure variation ΔP1 to the amount of hydrogen leak (NL/min) in step SP9 are as shown below.

The amount of hydrogen consumed by power generation (mol/sec)=power generation current (A)/(2*Faraday constant (96845 C/mol))*the number of cells [Relational Expression 2]

The amount of hydrogen consumed by power generation (L/sec)=the amount of hydrogen consumed by power generation (mol/sec)*22.4*(273+FC temperature (° C.))/273 [Relational Expression 3]

The speed of anode pressure decrease caused by power generation (kPa/sec)=the amount of hydrogen consumed by power generation (L/sec)/the volume of stack on the anode side (L)*101.3 (kPa) [Relational Expression 4]

In the present embodiment, the amount of anode pressure decrease (kPa) caused by power generation is obtained by integrating the speed of anode pressure decrease caused by the power generation.

The detection of a pressure variation caused by the current sweep or the correction based on the detection result is preferably performed periodically. For example, in the present embodiment, the detection of a pressure variation caused by the current sweep and the reflection of a correction based on the detection result are performed in accordance with a predetermined period (see FIG. 4(B)). In such a configuration, the detection and the reflection of a correction result can be performed several times, and the influence of the current sweep can be detected and reflected earlier as compared to the configuration where such detection and reflection of a correction result are performed at one time. Note that, in FIG. 4(B), the reference symbol C1 indicates the amount of anode pressure decrease in the first period, and the reference symbol C1' indicates the amount of anode pressure decrease in the second period (see FIG. 4(B)).

Second Embodiment

Figure 7:
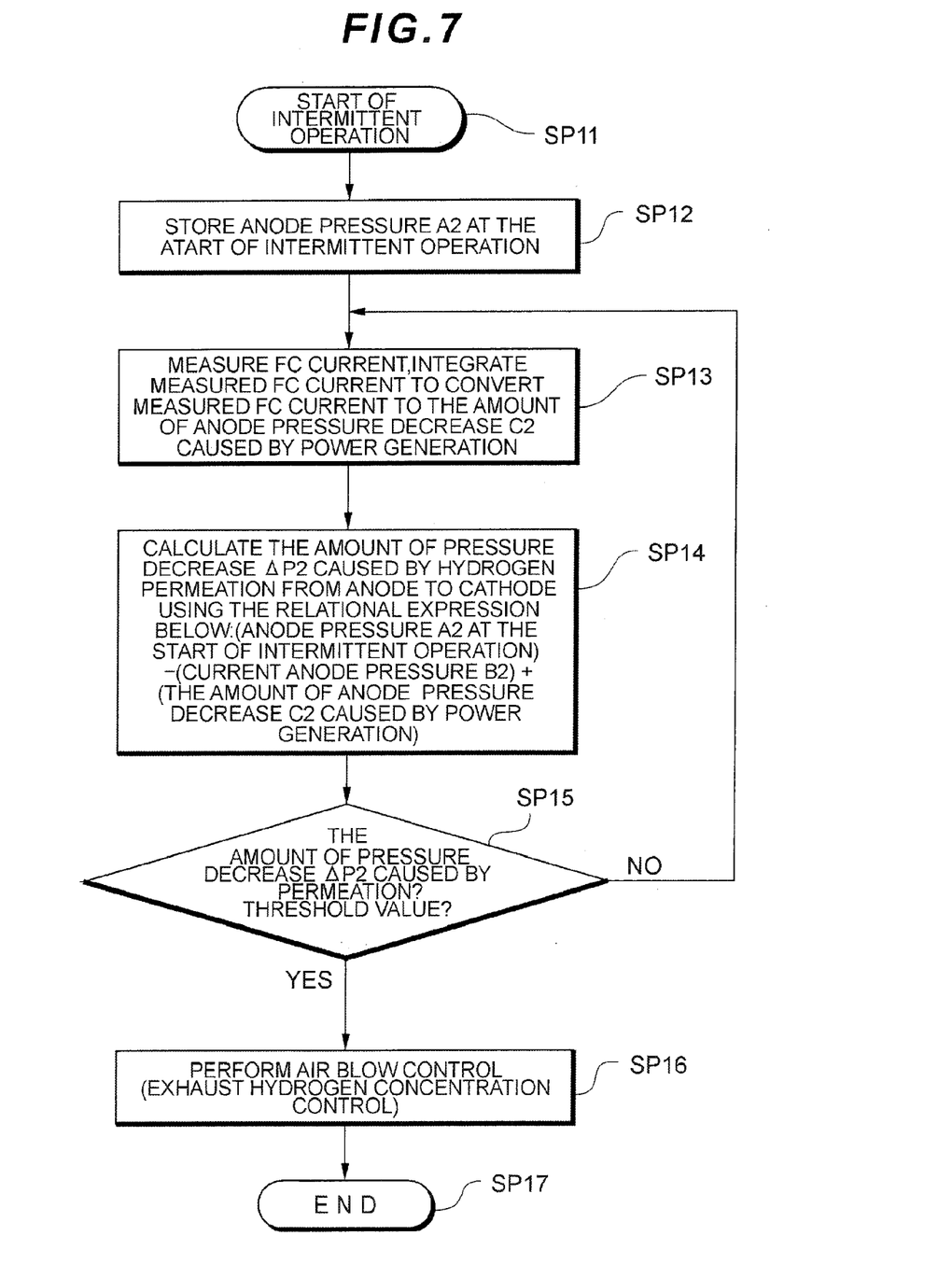
FIG. 7 is a flowchart showing an example of processing in the cross leak judgment.

Next, a specific example of a cross leak judgment which is made in a state where the fuel cell 1 is stopped will be described. Here, the following description describes the specific example of a cross leak judgment which is made in a state where the fuel cell 1 is stopped using: a graph of "pre-correction pressure decrease" indicating an anode pressure (the pressure of hydrogen gas) for which a hydrogen consumption caused by the current sweep is not taken into account (FIG. 6(A)); a graph of "post-correction pressure decrease" indicating the anode pressure for which the hydrogen consumption caused by the current sweep is taken into account (FIG. 6(B)); a graph of an "FC current" indicating a power generation current value in the fuel cell 1 (FIG. 6(C); and a flowchart showing an example of cross leak judgment processing (FIG. 7). The vertical axes in FIGS. 6(A) and 6(B) each indicate a pressure value, the vertical axis in FIG. 6(C) indicates a current value, and the horizontal axes in these figures each indicate time. The anode pressures in FIG. 6(A) and FIG. 6(B) each indicate a pressure in a so-called hydrogen low-pressure system in the anode or in the vicinity of the anode in the fuel cell 1.

First, when the intermittent operation is started in the fuel cell system 100 (step SP11), an anode pressure A2 at the start of the intermittent operation is detected and stored in, for example, a RAM in the control section 700 (step SP12).

Next, in step SP13, an FC current i is measured and the measured FC current i is integrated and converted to the amount of anode pressure decrease C2 caused by power generation. Then an anode pressure variation (the amount of decrease) $\Delta P2$ caused by hydrogen permeation from the anode to the cathode is obtained based on the following relational expression:

> The anode pressure variation (the amount of decrease)
> $\Delta P2$=anode pressure $A2$ at the start of an intermittent operation–the current anode pressure $B2$+the amount of anode pressure decrease $C2$ caused by power generation. [Relational Expression 5]

The anode pressure variation (the amount of decrease) $\Delta P2$ obtained as described above is a variation after a correction which has been made by taking the influence of the current sweep into account. In other words, assuming that the anode pressure at the start of the leakage judgment is A2 and the current anode pressure is B2 (see FIG. 6(B)), the difference between A2 and B2 (the value of A2–B2) corresponds to a pre-correction anode pressure variation $\Delta P$. In the related art, the value $\Delta P$ has been handled as a pressure variation resulting from a cross leak (or a hydrogen leak), and thus a misjudgment has often been made where it is determined that a cross leak occurs even when any cross leak does not actually occur. In this regard, in the present embodiment, the "amount of anode pressure decrease C2 caused by power generation" is determined, and an influence of the current sweep on the pressure is reflected, as described above. For example, if any cross leak does not occur during the intermittent operation, the pressure decrease resulting from a cross leak is 0 (zero), and, in the present embodiment, it is determined, by taking into account a pressure variation caused by the current sweep (the amount of anode pressure decrease C2), that the anode pressure variation $\Delta P2$ is 0, and therefore the judgment result that no cross leak occurs can be obtained (see FIG. 6(B)). On the other hand, in related art methods, the result that the anode pressure variation $\Delta P$ is 0 cannot be obtained in the same situation, which might raise the possibility of misjudgment (see FIG. 6(A)).

Next, it is judged whether or not the anode pressure variation (the amount of decrease) $\Delta P2$ caused by the hydrogen permeation is equal to or higher than a predetermined threshold value (step SP15). If the anode pressure variation (the amount of decrease) $\Delta P2$ caused by the hydrogen permeation is equal to or higher than the threshold value (step SP15: YES), an air blow control is performed so that the concentration of exhaust hydrogen is controlled so as to be equal to a certain level or lower (step SP16), and the cross leak judgment processing during the operation stop of the fuel cell system 100 is ended (step SP17). On the other hand, if the anode pressure variation (the amount of decrease) $\Delta P2$ caused by the hydrogen permeation is below the threshold value (step SP15: NO), the processing returns to step SP13, and the measurement of the FC current i and conversion of the FC current i to the amount of anode pressure decrease C2 by integrating the FC current i are performed again (step SP13).

Note that, when, for example, the anode pressure variation $\Delta P2$ is converted to the amount of hydrogen leak (NL/min) in step SP14, Expressions 2 to 4 shown above are relevant in the same way as in the first embodiment above. In the present embodiment, by integrating the speed of anode pressure decrease caused by power generation, the amount of anode pressure decrease (kPa) caused by power generation is obtained.

The detection of a pressure variation caused by the current sweep or the correction based on the detection result is preferably performed periodically. For example, in the present embodiment, the detection of a pressure variation caused by the current sweep and the reflection of a correction based on the detection result are performed in accordance with a predetermined period (see FIG. 6(B)). In such a configuration, the detection and the reflection of a correction result can be performed several times, and the influence of the current sweep can be detected and reflected earlier as compared to the configuration where such detection and reflection of a correction result are performed at one time. Note that, FIG. 6(B) shows the situation where the measurement of the FC current i was preformed, for example, three times, and, for the two measurements in which the FC current i has been obtained, the amount of anode pressure decrease is converted and corrected, and in FIG. 6(B), the reference symbol C2 indicates the amount of anode pressure decrease in the first period, and the reference symbol C2' indicates the amount of anode pressure decrease in the second period (see FIG. 6(B)).

When obtaining the anode pressure variation (the amount of decrease) $\Delta P2$ above, it is preferable to also perform temperature correction. As is obvious from, for example, Relational Expression 3 above, the FC temperature (the temperature of the fuel cell 1) also affects the amount of hydrogen consumed by power generation. Accordingly, by obtaining the anode pressure variation in consideration of, for example, the FC temperature (or the temperature of anode gas, etc., which is substantially equal to the FC temperature), judgment accuracy can further be improved.

As described above, in the fuel cell system 1 according to the present invention, during the intermittent operation where hydrogen supply is stopped, the hydrogen consumed by the current sweep is converted to the amount of pressure decrease, and this amount of pressure decrease is reflected in the total anode pressure decrease, thereby accurately obtaining only the amount of hydrogen leaked from the cathode or only the amount of cross-leaked hydrogen. More specifically, when a current sweep is performed during the intermittent operation, the amount of pressure decrease caused by the current sweep could be misjudged as being the amount of pressure decrease caused by a hydrogen leak, which might lead to a misdiagnosis, or the amount of pressure decrease caused by the current sweep could be misjudged as being the amount of pressure decrease caused by a cross leak, which might cause air blow to be performed more than necessary. On the other hand, in the present embodiment, in consideration of the influence of the current sweep during the intermittent operation, the amount of pressure decrease obtained as a detection result and the amount of pressure decrease resulting from the actual hydrogen leak (or cross leak) are separately handled, and the amount associated with the influence of the current sweep is corrected before a judgment is made, and therefore, judgment accuracy can be improved and a misjudgment can be suppressed.

Note that, although the embodiments above are examples of preferred embodiments of the present invention, the present invention is not limited thereto and various modifications may be made without departing from the scope of the present invention. For example, although an embodiment for carrying out the hydrogen leak judgment and an embodiment for carrying out the cross leak judgment are separately explained in the embodiments above, these judgments can be carried out continuously. When both of the judgments are carried out continuously, it is preferable to first carry out the cross leak judgment (second embodiment), and then carry out the hydrogen leak judgment (first embodiment). In general, the amount of cross leak is much smaller than the amount of hydrogen leak. Accordingly, if a cross leak is found and an air blow control is performed, the influence of such processing on the hydrogen leak judgment is very small. By using the hydrogen leak judgment method according to the present invention when continuously carrying out the cross leak judgment and then hydrogen leak judgment, both the judgments can be carried out with high accuracy and a misjudgment can be suppressed.

INDUSTRIAL APPLICABILITY

In the present invention, during the operation stop of a fuel cell, a pressure decrease caused by a current sweep can be suppressed from being misjudged as being the occurrence of a hydrogen leak or a cross leak, thereby improving the judgment accuracy of the hydrogen leak, etc. Accordingly, the present invention can widely be applied to fuel cell systems and hydrogen leak judgment in the systems which have such requirements.

What is claimed is:

1. A fuel cell system comprising:
a fuel cell having a cathode and an anode;
a power storage unit; and
a control unit programmed to:
(a) when the load on the fuel cell system is below a predetermined level and in an intermittent operation mode, stop the operation of the fuel cell such that electrical power is supplied from the power storage unit;
(b) perform a current sweep of the fuel cell to consume oxygen remaining in the cathode of the fuel cell and suppress degradation of the fuel cell while the fuel cell is stopped;
(c) receive a hydrogen pressure value in the anode of the fuel cell;
(d) correct the hydrogen pressure based on an amount of hydrogen consumed by the current sweep;
(e) determine whether there is a hydrogen leak or cross-leak based on the corrected hydrogen pressure.

2. The fuel cell system according to claim 1, wherein a hydrogen leak judgment based on a pressure decrease is performed on the basis of the corrected hydrogen pressure.

3. The fuel cell system according to claim 1, wherein, when a current resulting from the current sweep is equal to or higher than a predetermined value, a hydrogen leak judgment is performed on the basis of the corrected hydrogen pressure.

4. The fuel cell system according to claim 1, wherein when a current resulting from the current sweep is equal to or higher than a predetermined value, a cross leak judgment is performed on the basis of the corrected hydrogen pressure.

5. The fuel cell system according to claim 4, wherein an exhaust hydrogen concentration reduction control is performed when an amount of cross leak is equal to or higher than a predetermined value.

6. The fuel cell system according to claim 1, comprising a temperature sensor which measures a temperature of the fuel cell or a gas temperature in the anode, wherein the hydrogen pressure is corrected also in consideration of an influence of the temperature measured when the hydrogen pressure is corrected.

7. The fuel cell system according to claim 1, wherein the correction of the hydrogen pressure based on the amount of hydrogen consumed by the current sweep is performed periodically.

* * * * *